United States Patent [19]
Yokoi et al.

[11] Patent Number: 5,578,764
[45] Date of Patent: Nov. 26, 1996

[54] CORIOLIS TYPE MASS FLOWMETER UTILIZING PHASE SHIFTERS FOR PHASE SHIFTING OF THE OUTPUT SIGNALS

[75] Inventors: Toyoaki Yokoi; Hiroshi Owada, both of Tokyo, Japan

[73] Assignee: Yokogawa Electric Corporation, Tokyo, Japan

[21] Appl. No.: 498,310

[22] Filed: Jul. 5, 1995

[30] Foreign Application Priority Data

Jul. 11, 1994 [JP] Japan ................................. 6-158985

[51] Int. Cl.$^6$ ........................................................ G01F 1/84
[52] U.S. Cl. ................................................. 73/861.356
[58] Field of Search ..................... 73/861.355, 861.356, 73/861.357

[56] References Cited

U.S. PATENT DOCUMENTS 5,027,662  7/1991  Titlow et al. ..................... 73/861.356

Primary Examiner—Richard Chilcot
Assistant Examiner—Harshad Patel
Attorney, Agent, or Firm—Moonray Kojima

[57] ABSTRACT

A Coriolis type mass flowmeter utilizing a measuring tube through which flows the fluid being examined and a pair of Coriolis signals generated thereby, wherein are provided a first and second A/D converter to convert the respective pair of Coriolis signals into respective digital signals; a first and second phase shifter for converting the respective digital signals to output signals each deviated from the respective digital signals by 90°; a timing clock generator for supplying the first and second A/D converter with timing signals which are independent of vibrations of the Coriolis signals, and trigonometric calculating device for obtaining tan Φ using the following equation: tan Φ=(bc−ad)/(ac+bd), wherein a and c represent the outputs from the A/D converters, and b and d represent the outputs from the phase shifters, and tan Φ represents the tangent signal of the phase difference between the pair of Coriolis signals, whereby the speed of calculation is considerably increased and error of calculation is substantially eliminated.

10 Claims, 4 Drawing Sheets

CORIOLIS TYPE MASS FLOWMETER UTILIZING PHASE SHIFTERS FOR PHASE SHIFTING OF THE OUTPUT SIGNALS

BACKGROUND OF THE INVENTION

1. Field of Invention

This invention relates to a Coriolis type mass flowmeter; and more particularly, to such flowmeter wherein high speed calculations are performed without any substantial amount of calculation error.

2. Description of the Prior Art

A conventional Coriolis type mass flowmeter is depicted, for example, in FIGS. 1, 2 and 3, wherein FIG. 1 shows the construction of a sensor unit of a conventional Coriolis type mass flowmeter, FIG. 2 shows the operation of the sensor unit of FIG. 1, and FIG. 3 shows a converter for calculating mass flow in combination with the sensor unit of FIG. 1. In the specification, a straight tube is used as the measuring tube; however, other types of tubes may be used, such as, for example, a U-type tube, etc.

FIG. 1 shows a measuring tube 1 through which fluid being examined (also called "measurement target") flows. Both ends of tube 1 are fixed to support members 2 and 3. An exciter 4, for mechanically exciting, i.e. vibrating, tube 1 in a vertical direction is disposed near the center of tube 1. Sensors 5A and 5B are provided for detecting the vibration of tube 1 and are positioned near parts of tube 1 fixed to support members 2 and 3. A temperature sensor 6, which is used for temperature compensation, is disposed near support member 3. The foregoing components considered together may constitute sensor unit SNS.

When the fluid being examined flows through tube 1, while vibration in a primary mode represented by M1 and M2 in FIG. 2, is applied by exciter 4 to tube 1, tube 1 is vibrated in a secondary mode represented by M3 and M4 in FIG. 2. In practice, tube 1 is vibrated in such a vibration mode or pattern that the M1,M2 and M3,M4 types of vibration patterns are superposed on each other. The deformation of tube 1, due to vibration, is detected by sensors 5A,5B. The detection results are transmitted as displacement signals $S_A$ and $S_B$ to a converter TR1 as shown in FIG. 3.

Displacement signal $S_A$, which is detected by sensor 5A, is inputted to a frequency measuring circuit 7 to measure the signal frequency $f_A$ of displacement signal $S_A$. The signal frequency $f_A$ is outputted to a timing generator 8 to generate a timing signal $T_S$ which is used for sampling. Timing signal $T_S$ is used to indicate the time points of N which are obtained by accurately equally dividing one vibration period of tube 1 into equal number of parts N, wherein N represents an integer.

Also, displacement signal $S_A$ is outputted to a track and hold (T & H) circuit 9, whereat the signal $s_A$ is successively sampled and held at each of the N time points of each period of displacement signal $S_A$ with the sampling timing signal $T_S$ produced by timing generator 8. The held displacement signal $S_A$ is outputted to an analog to digital (A/D) converter 10 to be successively converted to a digital signal $D_{A1}$.

Digital signal $D_{A1}$ is subjected to a Fourier transformation to be converted to a frequency area in a discrete Fourier transform (DFT) circuit 11, whereat a phase $\theta_{A1}$ is calculated on the basis of the ratio of a real number component and an imaginary number component of the converted signal.

On the other hand, displacement signal $S_B$, which is detected by sensor 5B, is outputted to a track and hold (T & H) circuit 12, whereat signal $S_B$ is successively sampled and held at each of the N time points of each period of displacement signal using sampling time signal $T_S$ from timing generator 8. The held displacement signal $S_B$ is outputted to an analog to digital (A/D) converter 13 whereat the signal is successively converted to a digital signal $D_{B1}$.

The digital signal $D_{B1}$ is subjected to Fourier transformation to be converted to a frequency area in a discrete Fourier transform (DFT) circuit 14, whereat a phase $\theta_{B1}$ is calculated on the basis of the ratio of a real number component and an imaginary number component of the converted signal.

A phase difference calculation circuit 15 receives signals having phases $\theta_{A1}$ and $\theta_{B1}$ from DFT circuits 11 and 14 and then calculates the difference between such signal phases, and then successively outputs the calculation results as a phase difference signal $\theta_1$, that is:

$$\theta = \theta_{A1} - \theta_{B1} = \Phi \qquad (1)$$

Next, tan $\Phi$ is calculated on the basis of the phase difference signal $\theta_1$ (=$\Phi$), and then divided by signal frequency $f_A$ to calculate the mass flow. At the same time, tan $\Phi$ is subjected to temperature compensation using a temperature signal detected by sensor 6 and in circuit (not shown) to thereby produce an accurate mass signal.

Displacement signal $S_A$ is applied to an exciting circuit 16, and an exciting voltage, corresponding to the displacement signal, is outputted to the exciter 4 (see FIG. 1) to drive exciter 4 in a sine wave form, for example.

However, the conventional Coriolis type mass flowmeter, such as described above, needs a timing generator 8 becauses it uses sample values at the N points which are obtained by accurately dividing equally one period of the vibration frequency of the measuring tube into N equal parts. In addition, the vibration frequency varies in accordance with density, temperature, etc., of the fluid being examined, so that the measurement value also varies. Thus, measurement becomes unstable. Accordingly, the conventional Coriolis type mass flowmeter has a disadvantage in that the output cannot follow the variation with any high degree of precision.

Moreover, in the flowmeter, tan $\Phi$ is calculated on the basis of the phase difference signal $\theta_1$, so that the speed of calculation is slow, and errors of calculation tend to occur.

SUMMARY OF THE INVENTION

Accordingly, an object of the invention is to overcome the aforementioned and other deficiencies and disadvantages of the prior art.

Another object is to provide a Coriolis type mass flowmeter wherein high speed calculation can be performed without any substantial amount of errors of calculation.

A further object is to provide such flowmeter wherein calculations can be performed without first calculating a phase difference signal.

DETAILED DESCRIPTION OF THE PREFERRED EMBODIMENTS

Figure 1:
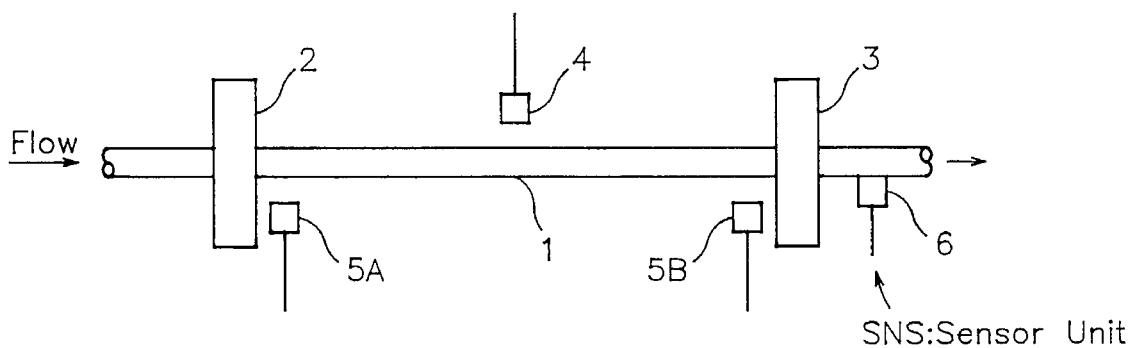
FIG. 1 is a diagram depicting a sensor unit of a conventional Coriolis type mass flowmeter.
Figure 2:
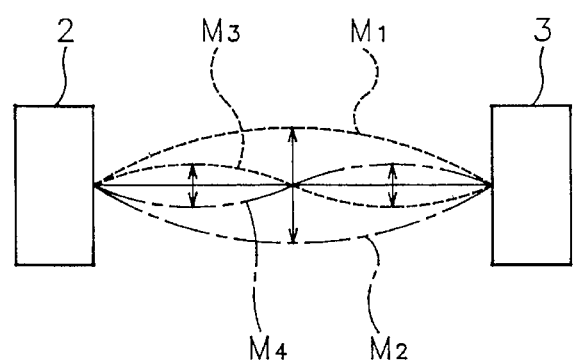
FIG. 2 is a diagram depicting the operation of the sensor unit of FIG. 1.
Figure 3:
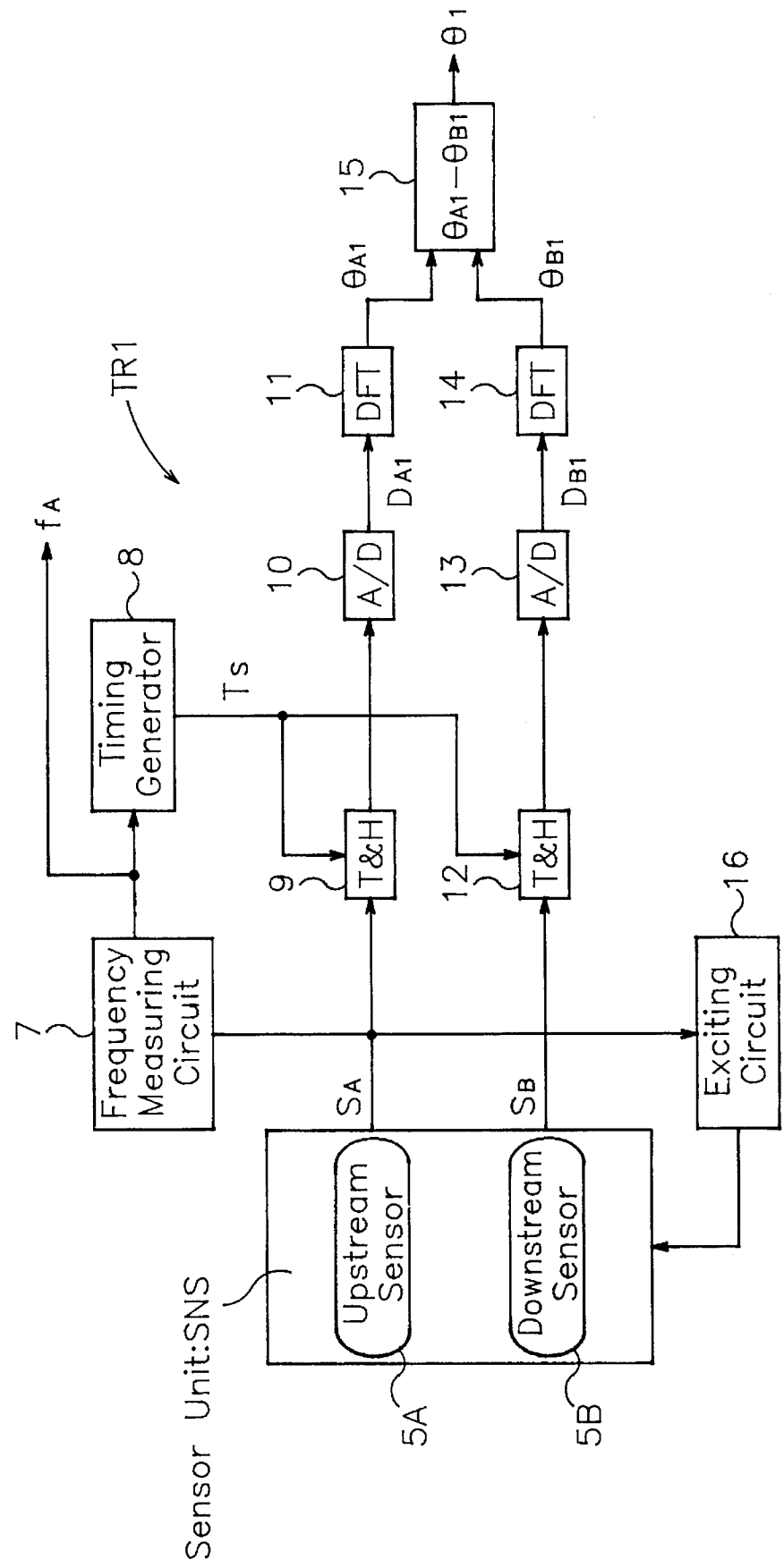
FIG. 3 is a block diagram depicting a converter, which performs signal processing, in combination with the sensor unit of FIG. 1.
Figure 4:
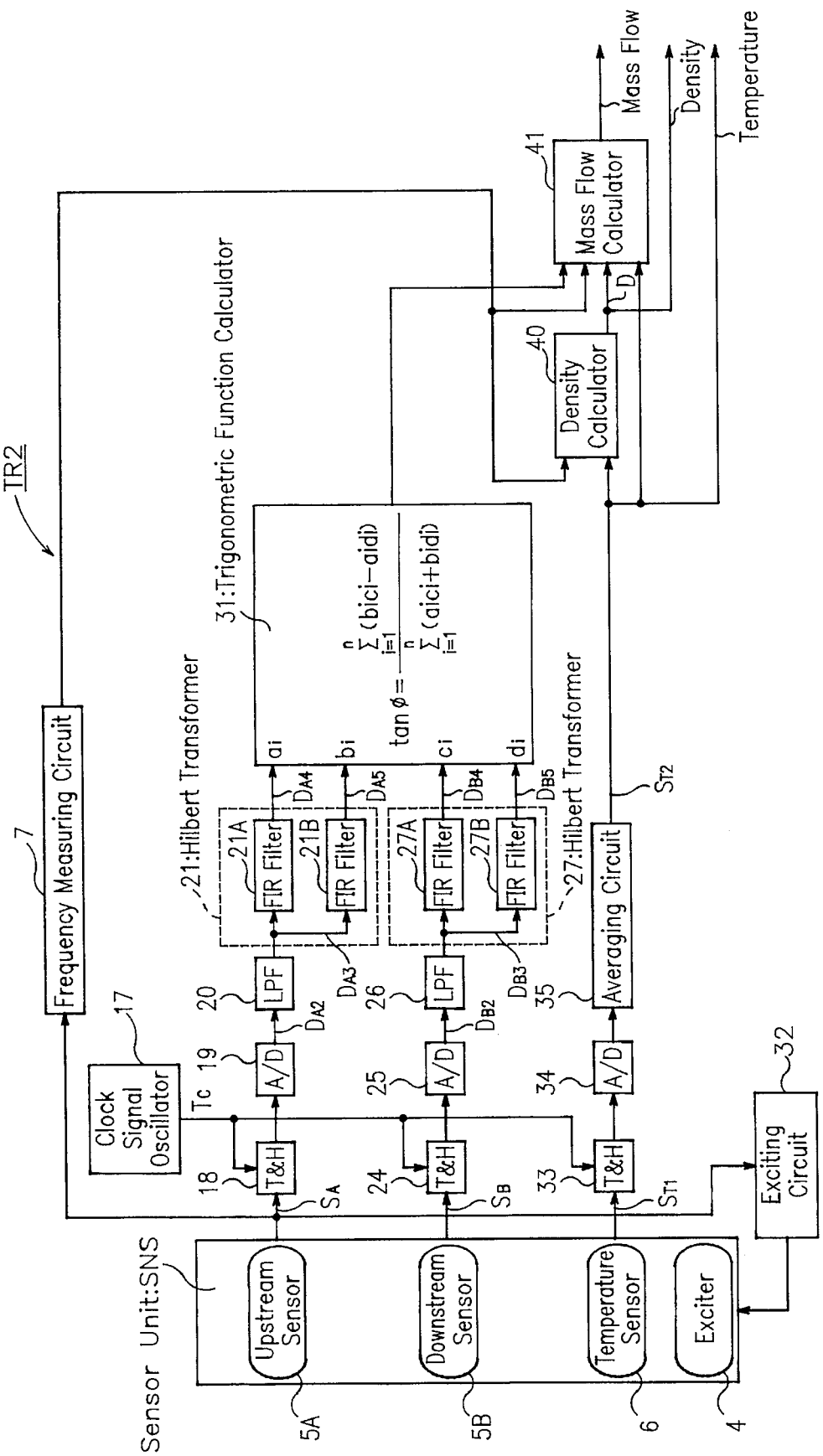
FIG. 4 is a block diagram depicting an illustrative embodiment of the invention.
Figure 8:
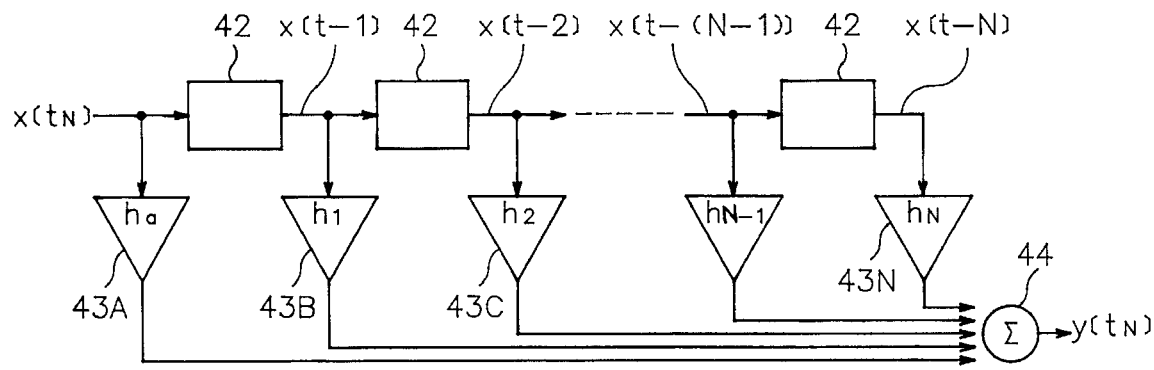
FIG. 8 is a diagram depicting details of the digital filter of FIG. 4.

FIG. 4 shows a Coriolis type mass flowmeter and FIG. 8 shows the construction of the digital filter shown in FIG. 4. In these figures, the same reference numbers are used as in FIG. 1 to represent the same functions, and no further description thereof is given hereat to improve clarity. Like the sensor unit of FIG. 1, sensor unit SNS shown in FIG. 4 comprises a measuring tube 1, support members 2 and 3, an exciter 4, sensors 5A and 5B, and a temperature sensor 6.

A converter TR2 is provided for processing a signal outputted from sensor unit SNS and comprises a clock signal oscillator 17 which generates a timing signal Tc having a prescribed sampling period irrespective of the vibration of measuring tube 1. A displacement signal $S_A$ is outputted to a track and hold circuit 18, for example, which may be in the form of A·sin ($wt_o$), whereat signal $S_A$ is successively sampled and held at each of the N time points of each period of displacement signal $S_A$ with use of timing signal Tc determining the timing of the sampling. A represents amplitude, w represents angular frequency, and $t_o$ represents a selected time.

The held displacement signal $S_A$ is outputted to an analog to digital (A/D) converter 19 to be successively converted to a digital signal $D_{A2}$, and then outputted to a low pass filter (LDF) 20 for processing an input signal in a digital mode. The low pass filter 20 removes from the digital signal $D_{A2}$ high frequency components which are near or higher than the vibration frequency of the tube 1, and then generates a digital signal $D_{A3}$ which is outputted to a Finite Impulse Response (FIR) filter 21A. This FIR filter 21A is a type of digital filter and its construction will be described further with reference to FIG. 8.

FIR filter 21A is an in-phase digital filter which is used to convert an input signal into an output signal having the same phase as the input signal. Filter 21A basically outputs from the output terminal thereof a digital signal $D_{A4}$ in the form of A·sin ($wt_o$). Also, digital signal $D_{A3}$ is outputted to an FIR filter 21B, which also is a type of digital filter, and will be further described with reference to FIG. 8. FIR filter 21B is a phase-shifting digital filter which is used to convert an input signal into an output signal whose phase is different from that of the input signal by 90°. Filter 21B basically outputs from the output terminal thereof a digital signal $D_{A5}$ in the form of A·cos ($wt_o$). FIR filter 21A and FIR filter 21B considered together constitute a Hilbert transformer 21.

On the other hand, displacement signal $S_B$ is outputted to a track and hold (T & H) circuit 24, for example, in the form of B·sin ($wt_o+\Phi$) whereat signal $S_B$ is successively sampled and held at each of the N time points of each period of signal $S_B$. B represents amplitude, and $\Phi$ represents the phase difference for signal $S_B$ at time point $t_o$.

Displacement signal $S_B$, which is held in T & H circuit 24, is outputted to an analog to digital (A/D) converter 25 to be successively converted to a digital signal $D_{B2}$, and then outputted to a low pass filter (LPF) 26 to be processed in a digital mode. Low pass filter 26 has the same construction as low pass filter 20. The gain characteristics and group delay characteristics of the two filters 20 and 26 are substantially the same. In a manner similar to low pass filter 20, low pass filter 26 removes from digital signal $D_{B2}$, high frequency components which are near and higher than the vibration frequency of tube 1, and generates a digital signal $D_{B3}$ which is outputted to an FIR filter 27A, which also is a type of digital filter.

In a manner similar to filter 21A, FIR filter 27A is an in-phase digital filter which is used to convert an input signal into an output signal having the same phase as the input signal. Filter 27A basically outputs from an output terminal thereof a digital signal $D_{B4}$ in the form of B·sin ($wt_o+\Phi$).

Digital signal $D_{B3}$ is also outputted to an FIR filter 27B which is a type of digital filter. FIR filter 27B is a phase-shifting digital filter which is used to convert an input signal into an output signal whose phase is different from that of the input signal by 90°. Filter 27B basically outputs a digital signal $D_{B5}$ in the form of B·cos ($wt_o+\Phi$). FIR filters 27A and 27B considered together constitute a Hilbert transformer 27.

A trigonometric function calculator 31 is provided and receives output signals from filters 21A ... 27B, as depicted. Representing digital signal $D_{A4}$, digital signal $D_{A5}$, digital signal $D_{B4}$ and digital signal $D_{B5}$, at time $t_i$, by $a_i$, $b_i$, $c_i$, and $d_i$, respectively, and representing a tangent signal of an average value in phase difference between a pair of Coriolis signals at times $t_1$ to $t_N$ by tan $\Phi$, the calculator 31 performs the following operations to obtain tan $\Phi$:

$$\tan \Phi = [\Sigma_{i=1}^{N}(b_i c_i - a_i d_i)]/[\Sigma_{i=1}^{N}(a_i c_i + b_i d_i)] \quad (2)$$

Figure 5:
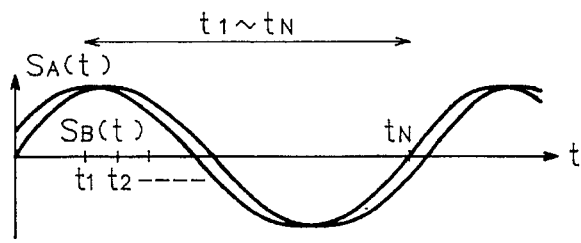
FIG. 5 is a graph depicting operation of the embodiment of FIG. 4.

Representing the two vibration signals obtained from sensor unit SNS by $S_A$ and $S_B$, the signals can be approximated by sine waves. Assuming that the phase of $S_B$ is advanced more forwardly, these signals then have the behavior shown in FIG. 5 and are represented by:

$$S_A(t) = G_1 \sin(wt) \quad (3)$$

$$S_B(t) = G_2 \sin(wt+\Phi) \quad (4)$$

wherein t is time, $G_1$ and $G_2$ are amplitude, w is angular frequency and $\Phi$ is the phase difference.

Figure 6:
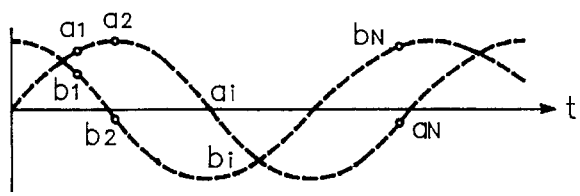
FIG. 6 is a graph depicting operation of the embodiment of FIG. 4.
Figure 7:
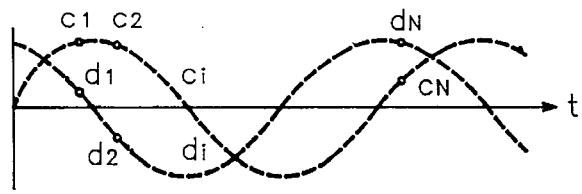
FIG. 7 is a graph depicting operation of the embodiment of FIG. 4.

Representing digital signal $D_{A4}$, digital signal $D_{A5}$, digital signal $D_{B4}$ and digital signal $D_{B5}$ at time $t_i$ by $a_i$, $b_i$, $c_i$ and $d_i$, respectively, then $a_i$ and $b_i$ have the behavior shown in FIG. 6, and $c_i$ and $d_i$ have the behavior shown in FIG. 7, and $a_i$ to $d_i$ are represented by the following:

$$a_i = G_1 \sin(wt_i) \quad (5)$$

$$b_i = G_1 \cos(wt_i) \quad (6)$$

$$c_i = G_2 \sin(wt_i+\Phi) \quad (7)$$

$$d_i = G_2 \cos(wt_i+\Phi) \quad (8)$$

Substituting $a_i$ to $d_i$ into the following trigonometric formulae, the below equation (9) is obtained: tan ($\beta-\alpha$)=[sin ($\beta-\alpha$)]/[cos ($\beta-\alpha$)]=(sin $\beta$ cos $\alpha$ −cos $\beta$ sin $\alpha$)/(cos $\beta$ cos $\alpha$+sin $\beta$ sin $\alpha$).

$$\tan \overline{\phi} = \tan[(wt_i + \overline{\phi}) - (wt_i)] \qquad (9)$$
$$= \{[(G_2\sin(wt_i + \overline{\phi})G_1\cos(wt_i)] -$$
$$[G_2\cos(wt_i + \overline{\phi})G_1\sin(wt_i)]\}/$$
$$\{[(G_2\cos(wt_i + \overline{\phi})G_1\cos(wt_i)] +$$
$$[G_2\sin(wt_i + \overline{\phi})G_1\sin(wt_i)]\}$$
$$= (b_i c_i - a_i d_i)/(a_i c_i + b_i d_i)$$

According to the above equation, $\tan \Phi$ at the time $t_i$ is obtained.

The N-point average $\tan \Phi$ of times $t_1$ to $t_N$ is calculated as follows:

$$\text{N-point average } \tan \Phi = (1/N)\Sigma_{i=1}^{N}[(b_i c_i - a_i d_i)/(a_i c_i + b_i d_i)] \qquad (10)$$

Also, the N-point average $\tan \Phi$ at times $t_1$ to $t_N$ is approximate calculated as follows:

$$\text{N-point average } \tan \Phi = [\Sigma_{i=1}^{N}(b_i c_i - a_i d_i)]/[\Sigma_{i=1}^{N}(a_i c_i + b_i d_i)] \qquad (11)$$

The calculations can be performed at a higher speed by using equation (11) instead of equation (10).

Exciting circuit 32 is supplied also with displacement signal $S_A$. Circuit 32 then supplies exciter 4 with an exciting voltage corresponding to displacement signal $S_A$ to drive exciter 4 in a sine wave form, for example.

Also, a temperature signal $S_{T1}$ is outputted from temperature sensor 6 to track and hold circuit 33. A plurality of temperature signals are held and sampled at timing determined by timing signal Tc and applied to analog to digital circuit 34 whereat the signals are converted into digital signals, and outputted to an averaging circuit 35 whereat the signals are averaged and outputted as a temperature signal $S_{T2}$.

A density calculator 40 is supplied with signal frequency $f_A$ and temperature signal $S_{T2}$ and performs calculations to calculate the density of the fluid being measured according to the following equation:

$$f_V = f_A + K_1 \cdot S_{T2} \qquad (12)$$

$$D = K_2(f_0^2 - f_V^2)/f_V^2 \qquad (13)$$

wherein $f_V$ is the resonance frequency when the fluid being measured is filled in the measuring tube 1 at a reference temperature; $f_0$ is the resonance frequency when the measuring tube 1 is vacant at the reference temperature; and $K_1$ and $K_2$ are constants.

A mass flow calculator 41 is supplied with density signal D, signal frequency $f_A$, $\tan \Phi$ and temperature signal $S_{T2}$, and calculations are performed thereby to calculate the mass flow $Q_M$ on the basis of the following equation:

$$Q_M = f(S_{T2}) \cdot f(D) \cdot \tan \Phi/f_A \qquad (14)$$

wherein $f(S_{T2})$ represents a correction term for temperature and $f(D)$ represents a correction term for density.

FIG. 8 shows details of FIR filters 21A, 21B, 27A, 27B. In the description, digital signals $D_{A3}$ and $D_{B3}$ at sampling time $t_n$ is represented by $x[t_n]$, and the digital signals $D_{A4}$, $D_{A5}$, $D_{B4}$, and $D_{B5}$ at sampling time $t_n$ are presented by $y[t_n]$.

Delay unit 42 corresponds to sampling period T. A plurality of delay units 42 are cascade connected to one another to successively delay an input signal by sampling period T, thereby outputting the values of $x[t-1]$, $x[t-2]$, ..., $x[t-N]$ at the respective output terminals of delay units 42. $x[t_n]$, $x[t-1]$, $x[t-2]$, ..., $x[t-N]$ are supplied to an adder 44 through a multiplier 43A having a multiplier coefficient $h_0$, a multiplier 43B having a multiplier coefficient $h_i$, a multiplier 43C having a multiplier coefficient $h_2$, ..., a multiplier 43N having a multiplier coefficient $h_N$, respectively, whereat these values are added together so that the value of $y[t_n]$ is obtained at the output of adder 44. By setting each of the multiplier coefficients $h_0$, $h_1$ ..., $h_N$ to any value, $y[t_n]$ may be outputted so that the phase thereof is coincident with that of $x[t_n]$, or so that the phase is deviated from that of $X[t_n]$ by 90°, or so that it has any desired frequency characteristic.

More specifically, each of the multiplier coefficients $h_0$, $h_1$, ... $h_N$, is set to satisfy the following condition: the FIR filters 21A and 21B have similar gain characteristic wherein signals are allowed to pass through only a frequency band whose frequencies are near and equal to the vibration frequency of the measuring tube, and have similar group delay characteristics wherein in a pass frequency band that the phase of FIR filter 27B advances more forwardly than FIR filter 21A by 90°. This relationship is also satisfied between FIR filters 27A and 27B.

In the embodiment, Hilbert transformers 21 and 27 are used. However, any other means may be used which converts the output signal of the A/D converter to a signal whose phase is deviated from that of the output signal by 90°.

Moreover, in the embodiment, the trigonometric function calculator 31 performs the following calculation:

$$\tan \Phi = [\Sigma_{i=1}^{N}(b_i c_i - a_i d_i)]/[\Sigma_{i=1}^{N}(a_i c_i + b_i d_i)],$$

wherein digital signals $D_A4$, $D_{A5}$, $D_{b4}$, and $D_{B5}$ at time $t_i$ are represented by $a_i$, $b_i$, $c_i$, and $d_i$, respectively, and the tangent signal of an average value in phase difference between a pair of Coriolis signals at times $t_1$ to $t_N$ is represented by $\tan \Phi$. However, instead of the above calculation, calculator 31 may perform the following calculation to obtain $\tan \Phi$:

$$\tan \Phi = (1/N)\Sigma_{i=1}^{N}[(b_i c_i - a_i d_i)/(a_i c_i + b_i d_i)]$$

Also, calculator 31 may calculate signals a,b,c, and d at a certain point in time and perform the following calculation to obtain $\tan \Phi$, although the measurement precision may be reduced slightly:

$$\tan \Phi = (bc - ad)/(ac + bd)$$

The embodiment of FIG. 4 is realized by using discrete circuit elements. However, with respect to the signal processing subsequent to the analog to digital converters 19,25, and 34, the functions of the respective circuits may be successively executed using software and appropriate hardware such as microprocessor, memory, etc to thereby obtain the mass flow signal.

In the invention, displacement signal $S_A$ is used as the input signal to exciting circuit 35. However, displacement signal $S_B$ may be used in place of signal $S_A$. Furthermore, in the embodiment, the A/D converters 19,25,34 are separately provided as individual converters. However, these converters may be so constructed that a single converter is used with a multiplexer having multiple input terminals and one output terminal.

The sensor unit SHS is described as being of a straight tube type. However, the shape of the measuring tube 1 can be of other shapes, such as an U-shaped tube, etc.

As described, the signal from the sensor unit is sampled at a fixed sampling rate which is not dependent on the vibration frequency varying in accordance with density, temperature, etc of the fluid being measured. Thus, no timing generator is needed in the invention, in contrast with conventional flowmeters, and hence, stable measurement values are obtained with the invention having high precision and employing simple construction.

Moreover, since no phase difference signal $\theta_1$ is calculated and $\tan \Phi$ is calculated in place of phase difference signal $\theta_1$, the calculation can be performed at high speeds, and calculation errors are substantially reduced.

According to the invention, the tangent signal $\tan \Phi$ of the average value in the phase difference of a pair of Coriolis signals at times $t_1$ to $t_N$ is calculated when the following calculation is used:

$$\tan \Phi = (1/N)\Sigma_{i=1}^{N}[(b_i c_i - a_i d_i)/(a_i c_i + b_i d_i)].$$

Thus, calculation is performed at high speeds and errors are substantiall eliminated.

Moreover, the same effect can be attained with less calculation using the following:

$$\tan \Phi = [\Sigma_{i=1}^{N}(b_i c_i - a_i d_i)]/[\Sigma_{i=1}^{N}(a_i c_i + b_i d_i)].$$

With this calculation, high speed with reduced error rate is also attained.

According to the invention, the same characteristics, except for the phase, are set in the phase-shifting filter and the in-phase filter, so that errors are prevented from occurring which would otherwise occur when no in-phase filter is used and only the phase shifting filter is used.

Also, a finite impulse response filter is used as the in-phase digital filter and the phase-shifting digital filter. Thus, the phase difference and vibration frequency are attained with high precision and without inducing temperature variations and phase distortions. Thus, mass flow measurement is attained with high precision.

Furthermore, according to the invention, a band pass characteristic is provided in the finite impulse response filter and the Hilbert transform filter. Thus, only signals whose frequencies are in the area of the vibration frequency of the measuring tube are allowed to pass through the filters. Thus, undesired signals are readily removed without adversely affecting the device.

Also, a pair of low pass filters are provided in the invention at respective subsequent stages of the analog to digital converters, and each output thereof is used as a digital signal. Thus, the frequency band of the signal can be controlled beforehand, and the signal processing at subsequent stages is simplified.

The foregoing description is illustrative of the principles of the invention. Numerous extensions and modifications thereof would be apparent to the worker skilled in the art. All such modifications and extensions are to be considered to be within the spirit and scope of the invention.

What is claimed is:

1. In a Coriolis type mass flowmeter comprising a measuring tube through which a fluid being examined flows and having a pair of fixed ends and means for vibrating the measuring tube in a prescribed mode to measure mass flow with a pair of Coriolis signals obtained by vibrating the measuring tube; the improvement comprising a first analog to digital converter means for converting one of said pair of Coriolis signals to a first digital output signal;

a second analog to digital converter means for converting another of said pair of Coriolis signals to a second digital output signal;

a first phase shifter means for converting said first digial output signal to a first converted signal whose phase is deviated from the phase of said first digital output signal by 90°;

a second phase shifter means for converting said second digital to a second converted signal whose phase is deviated from the phase of said second digital output signal by 90°;

a trigonometric function calculator means for calculating the following equation to obtain $\tan \Phi$:

$$\tan \Phi = (bc - ad)/(ac + bd),$$

wherein a represents the first digital output signal, b represents the first converted signal, c represents the second digital output signal, d represents the second converted signal, and $\tan \Phi$ represents a tangent signal of the phase difference between said pair of Coriolis signals; and clock generator means for supplying said first and second analog to digital converter means with a timing signal having a prescribed sampling period which is independent of said Coriolis signals.

2. The flowmeter of claim 1, wherein said trigonometic function calculator means performs any of the following calculations to obtain $\tan \Phi$:

$$\tan \Phi = (1/N)\Sigma_{i=1}^{N}(b_i c_i - a_i d_i)/(a_i c_i + b_i d_i)$$

$$\tan \Phi = [\Sigma_{i=1}^{N}(b_i c_i - a_i d_i)]/[\Sigma_{i=1}^{N}(a_i c_i + b_i d_i)]$$

wherein $a_i$, $b_i$, $c_i$, and $d_i$, represent said first digital output signal, said first converted signal, said second digital output signal, and said second converted signal at time $t_i$, respectively, and $\tan \Phi$ represents a tangent signal of an average value in phase difference between said pair of Coriolis signals at times $t_1$ to $t_N$.

3. The flowmeter of claim 1, wherein each of said first and second phase shifter means comprises a phase-shifting digital filter; and an in-phase digital filter provided between of each of said first and second analog to digital converter means, and said trigonometric function calculator means; and wherein said phase-shifting digital filter and said in-phase digital filter constitute a Hilbert transformer.

4. The flowmeter of claim 2, wherein each of said first and second phase shifter means comprises a phase-shifting digital filter; and an in-phase digital filter provided between each of said first and second analog to digital converter means, and said trigonometric function calculator means; and wherein said phase-shifting digital filter and said in-phase digital filter constitute a Hilbert transformer.

5. The flowmeter of claim 3, wherein each of said in-phase digital filter and said phase-shifting digital filter comprises a finite impulse response filter.

6. The flowmeter of claim 4, wherein each of said in-phase digital filter and said phase-shifting digital filter comprises a finite impulse response filter.

7. The flowmeter of claim 5, wherein said finite impulse response filter is provided with a band pass characteristic.

8. The flowmeter of claim 6, wherein said finite impulse response filter is provided with a band pass characteristic.

9. The flowmeter of claim 1, further comprising a pair of low pass filter connected upstream of said first and second analog to digital converter means, wherein outputs of said low pass filter means are used as respective input digital signals to said first and second phase shifter means.

10. The flowmeter of claim 2 further comprising a pair of low pass filter connected upstream of said first and second analog to digital converter means, and wherein outputs of said low pass filter means are used as respective input digital signals to said first and second phase shifter means.

* * * * *